United States Patent
Carpenter, II et al.

(10) Patent No.: US 11,023,955 B1
(45) Date of Patent: Jun. 1, 2021

(54) OUTSIDE ORDERING SYSTEM

(71) Applicant: Valyant AI, Inc., Denver, CO (US)

(72) Inventors: Robley Theron Carpenter, II, Denver, CO (US); Benjamin William Thielker, Denver, CO (US); Jacob Daniel Poore, Loveland, CO (US)

(73) Assignee: Valyant AI, Inc., Denver, CO (US)

( * ) Notice: Subject to any disclaimer, the term of this patent is extended or adjusted under 35 U.S.C. 154(b) by 0 days.

(21) Appl. No.: 16/585,728

(22) Filed: Sep. 27, 2019

(51) Int. Cl.
*G06Q 30/06* (2012.01)
*H04R 3/00* (2006.01)
*G10K 11/178* (2006.01)
*H04N 5/247* (2006.01)
*G06K 9/00* (2006.01)
*G06K 9/32* (2006.01)
*H04N 7/18* (2006.01)
*H04R 1/02* (2006.01)
*G10L 25/78* (2013.01)
*G06Q 50/12* (2012.01)
*H04R 1/40* (2006.01)

(52) U.S. Cl.
CPC ....... *G06Q 30/0633* (2013.01); *G06K 9/0063* (2013.01); *G06K 9/00302* (2013.01); *G06K 9/00335* (2013.01); *G06K 9/325* (2013.01); *G06Q 50/12* (2013.01); *G10K 11/17823* (2018.01); *G10L 25/78* (2013.01); *H04N 5/247* (2013.01); *H04N 7/18* (2013.01); *H04R 1/025* (2013.01); *H04R 1/406* (2013.01); *H04R 3/005* (2013.01); *G06K 2209/15* (2013.01); *G10K 2210/3044* (2013.01)

(58) Field of Classification Search
CPC .......................... G06Q 30/0633; H04R 1/025
See application file for complete search history.

(56) References Cited

U.S. PATENT DOCUMENTS

| | | |
|---|---|---|
| 5,053,868 A | 10/1991 | Higgins et al. |
| 5,168,354 A | 12/1992 | Martinez et al. |
| 5,594,803 A | 1/1997 | Fujiwara et al. |
| 6,194,282 B1 | 2/2001 | Niimi et al. |
| 6,842,719 B1 | 1/2005 | Fitzpatrick et al. |
| 8,292,433 B2 | 10/2012 | Vertegaal |
| 8,365,868 B2 | 2/2013 | Johnson et al. |
| 8,620,753 B2 | 12/2013 | Burns et al. |
| 8,626,590 B2 | 1/2014 | Istfan |
| 8,880,291 B2 | 11/2014 | Hampiholi |
| 9,125,178 B2 | 9/2015 | Taniguchi et al. |
| 9,715,665 B2 | 7/2017 | Schondorf et al. |
| 9,868,332 B2 | 1/2018 | Anderson et al. |
| 10,169,837 B2 | 1/2019 | Wilson et al. |
| 10,304,147 B2 | 5/2019 | Kelly et al. |
| 10,387,945 B2 | 8/2019 | Burry et al. |
| 2013/0024299 A1* | 1/2013 | Wong ............... G06Q 30/06 705/15 |
| 2013/0325474 A1* | 12/2013 | Levien ............ G10L 15/065 704/251 |

(Continued)

*Primary Examiner* — Girumsew Wendmagegn
(74) *Attorney, Agent, or Firm* — Hall Estill Attorneys at Law; Tyler Mantooth

(57) ABSTRACT

An outside ordering system may employ one or more devices having a controller, camera array, microphone array, and speaker positioned within a device housing located outside of a building. The camera array can be positioned to identify a vehicle in which a customer resides and at least one facial gesture of the customer.

19 Claims, 3 Drawing Sheets

(56) References Cited

U.S. PATENT DOCUMENTS

| | | | |
|---|---|---|---|
| 2015/0070471 A1* | 3/2015 | Loce | G06K 9/00785 348/47 |
| 2016/0014506 A1* | 1/2016 | Tanaka | H04R 1/406 381/92 |
| 2016/0148306 A1 | 5/2016 | Bellavance et al. | |
| 2020/0034848 A1* | 1/2020 | Seo | G06K 9/00624 |

* cited by examiner

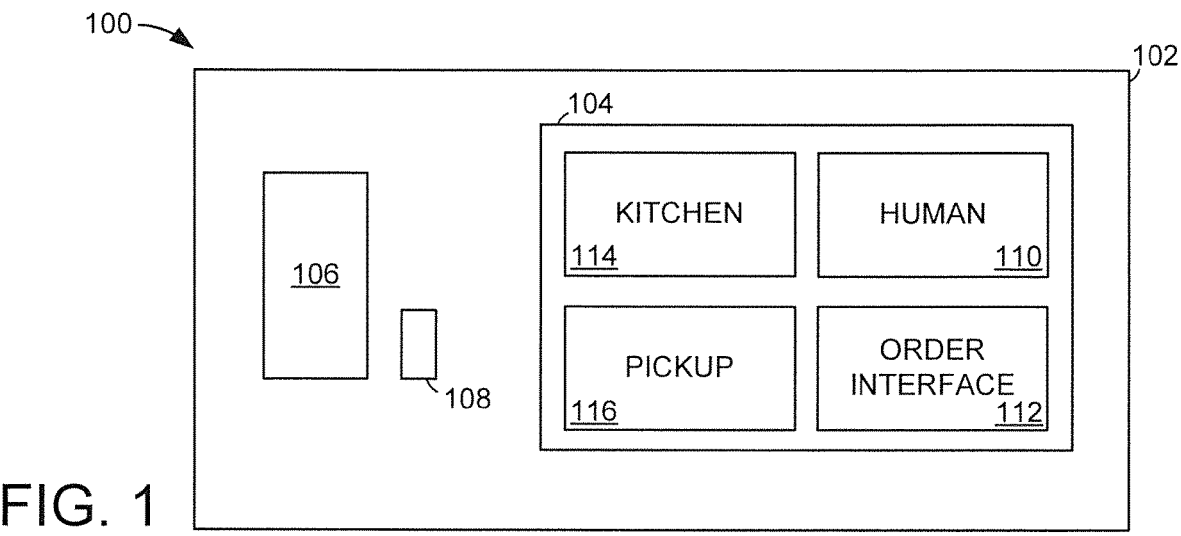
FIG. 1
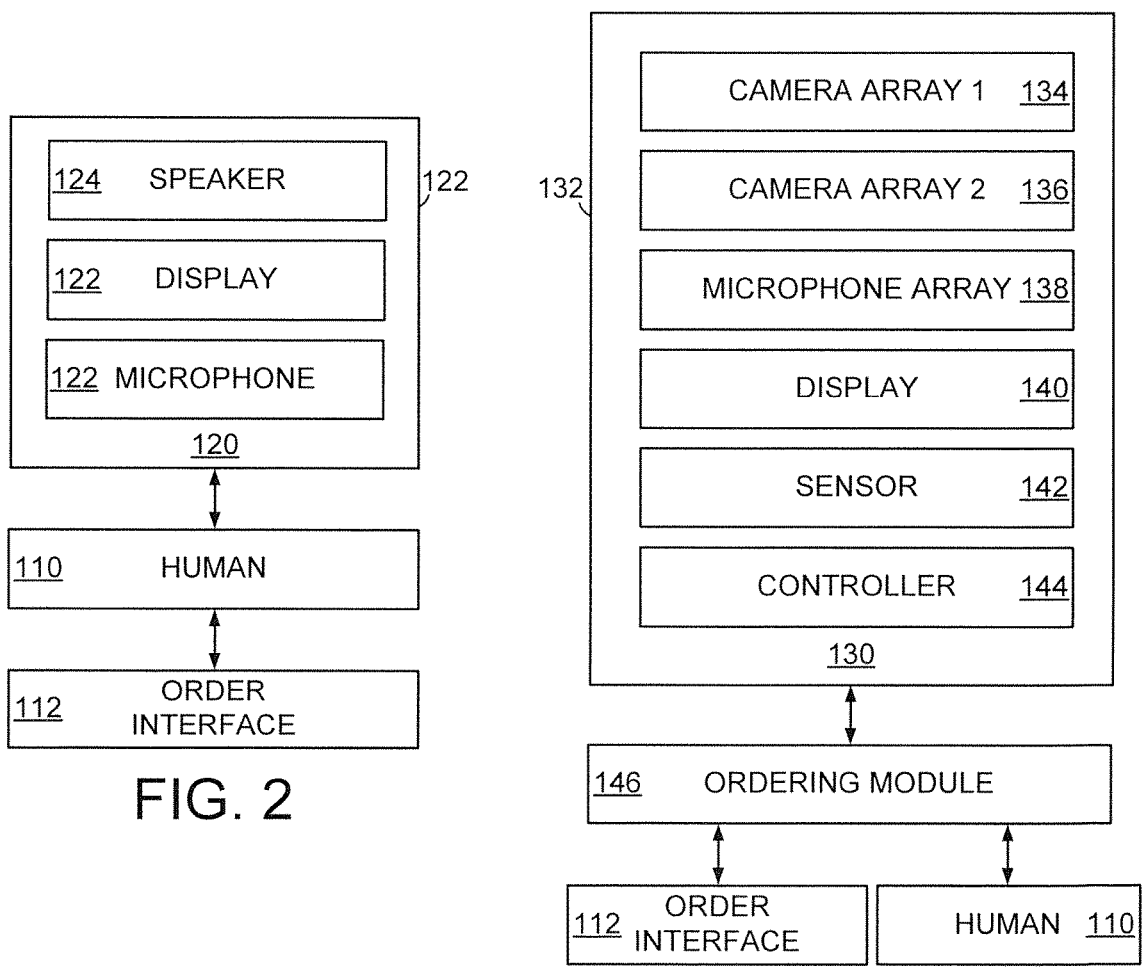
FIG. 2
FIG. 3

OUTSIDE ORDERING SYSTEM

SUMMARY

A system for servicing an order taken from an outside location, in accordance with various embodiments, consists of a device having a controller, camera array, microphone array, and speaker positioned within a device housing located outside of a building. The camera array is positioned to identify a vehicle in which a customer resides and at least one facial gesture of the customer.

In other embodiments, an outside location customer ordering system can have a controller, a first camera array, a second camera array, a microphone array, and a speaker each positioned within a device housing located outside of a building. The controller is connected to an ordering module disposed between the device housing and an order interface. The camera array is positioned to identify a vehicle in which a customer resides and at least one facial gesture of the customer.

A customer can place an order from an outside location via an ordering system configured in accordance with some embodiments to have a device housing positioned outside of a building in which a controller and a camera array are each positioned. The camera array is positioned to identify a vehicle in which a customer resides and at least one facial gesture of the customer. An ordering module is connected to the controller and is positioned external to the device housing with an order interface being connected to the ordering module.

BRIEF DESCRIPTION OF THE DRAWINGS

FIG. 1 is a block representation of an example ordering environment in which various embodiments can be practiced.

FIG. 2 displays a block representation of an example outside ordering system capable of being used in the ordering site of FIG. 1.

FIG. 3 shows an example outside ordering system arranged in accordance with various embodiments.

DETAILED DESCRIPTION

Figure 4:
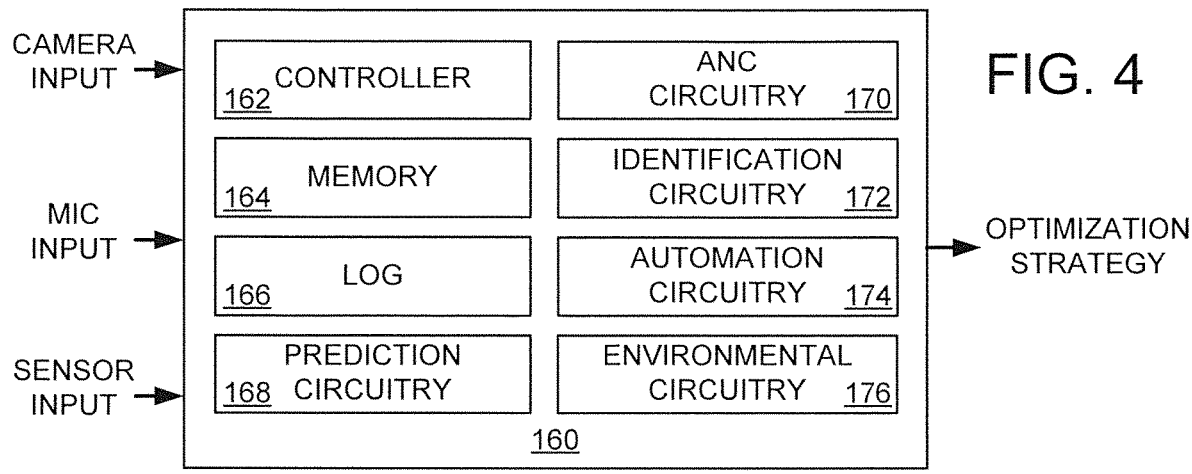
FIG. 4 illustrates a block representation of an example ordering module that can be utilized in an outside ordering system in accordance with some embodiments.

This disclosure generally relates to embodiments of a system that intelligently optimizes hardware associated with taking and servicing customer's orders taken in an outside environment.

Despite computing technology progressively becoming more prevalent in many aspects of life, ordering from a location outside of a retail establishment has remain largely unchanged. That is, placing an order for food, goods, or banking services from a location outside has remained relatively crude, inefficient, and imprecise. For instance, a simple speaker/microphone connection with an employee inside the retail business has been utilized with minimal computing aids, besides a display screen, for communicating a retail order.

With various other aspects of life aided with computing efficiencies, the average customer of a retail business generally has a shorter amount of patience and verbal communication skills compared to decades ago when smartphones, tablets, and mobile computing were not so prevalent. Hence, the average customer is accustomed to computing technology playing a part of their daily lives and likely have perceivably low business experiences from outside location ordering that does not utilize more than a simple microphone/speaker to conduct a retail order.

Accordingly, assorted embodiments are directed to an outside location customer ordering system that utilizes computing technology to optimize the collection of customer data as well as the customer's verbal order. By employing computing intelligence to collect, process, and execute various aspects of a customer ordering experience, customer satisfaction can be heightened. The use of computing technology can further increase the efficiency and profitability of a retail business as customer's orders are received more quickly and clearly.

Turning to the drawings, FIG. 1 depicts a block representation of an example retail environment 100 in which embodiments of an outside ordering system can be practiced. It is noted that the retail environment 100 may comprise one or more businesses that conduct food, goods, and/or financial services for customers while the customer remains in a vehicle. That is, the retail environment 100 is configured to allow a customer to remain in a vehicle while ordering a service and continuously until the service has been satisfied.

In the non-limiting example of FIG. 1, a food service business is positioned on a site 102 and has at least one building 104 outfitted to fulfill orders made by a customer 106, as represented by a vehicle, via an ordering device 108 to a human employee 110. It is contemplated that orders may be made from an online and/or automated platform that bypasses the human employee 110 from communicating directly with the customer 106.

Regardless of whether the human employee 110 communicates directly with the customer 106, one or more orders can be inputted into an order interface 112 that prompts a kitchen 114, and the kitchen's constituent staff, into actions that satisfy the order(s). Once an order has been satisfied, the customer 106 can receive the ordered food via a drive-through pickup 116 or a delivery service by the human employee 110. In a banking retail environment, a food order is replaced with a financial transaction request and the kitchen 114 would be replaced with a computerized, or manual, financial platform.

While various types of retail orders, transactions, and products can be transferred in a retail environment 100, the mechanism for taking a customer's order from an outside location via the ordering device 108 is believed to be a source for inefficiency, customer 106 frustration, and lost profits. FIG. 2 depicts a block representation of an example outside ordering device 120 which can be utilized in the retail environment 100. The ordering device 120 can consist of a weather-proof housing 122 in which at least a microphone 124 and speaker 126 are positioned to provide a communication pathway between a customer and a retail business. It is contemplated, but not required, that a graphical display 128 is also positioned in the housing 122 to convey various promotional and/or ordering information to a customer.

The ordering device 120 can be connected to one or more human employees 110 that can monitor and/or activate the various aspects of the device 120. For instance, a first employee 110 may be able to listen to the input from the microphone 124 without the ability to speak through the speaker 126 while another employee 110 can manipulate the content of the display 128 without hearing or speaking to a customer via the device 120. In other embodiments, multiple employees 110 can each have full access and capability to activate the speaker 126, microphone 124, and display 128 aspects of the device 120 at will.

Subsequent to the interaction of a human employee 110 with a customer 106 to take an order, the employee 110 relays the order into an order interface 112 that conveys the order to the kitchen 114 and/or other aspects of a business where the customer's order is tracked and serviced. It is contemplated that the ordering device 120 conveys a customer's order directly to the order interface 112, such as via voice-to-text translation, without relaying through a human employee 110. However, such direct order interface 112 routing of an order has been plagued by the quality of the ordering device 120 in different conditions. For example, the microphone 124 may suffer from interference from weather, such as wind or rain, or may suffer from a lack of clarity due to age or the behavior of the customer, such as soft talking volume, intermittent speech, or a prominent accent.

Hence, despite technology that can, potentially, bypass human 110 activity in order taking and conveyance into an order interface 112, operational and performance bottlenecks can be experienced that jeopardize any time efficiency saved by the bypassing of the human employee 110. Accordingly, assorted embodiments heighten the technological capabilities of the outside ordering device 120 to provide intelligent customer interaction with accurate and profitable efficiency.

FIG. 3 depicts a block representation of an example outside ordering device 130 configured in accordance with various embodiments. The device 130 can comprise one or more housings 132 where at least a first camera array 134 and a second camera array 136 are positioned. A camera array 134/136 can consist of one or more optical sensors capable of detecting assorted optical metrics, such as light, movement, color, depth, and video. The respective camera arrays 134/136 may consist, in some embodiments, of different optical sensors while other embodiments construct the camera arrays 134/136 with at least one matching sensor to allow for spare and/or redundant activation.

An array of microphones 138 may also be incorporated into a device housing 132 with one or more microphones that may have similar, or dissimilar, sound detection capabilities. For instance, the microphone array 138 can have several different microphones that operate concurrently, or have multiple redundant microphones that operate sequentially, to detect sound. The microphone array 138 may be distributed throughout the device housing 132 and/or have different directional positions that distribute sound sensing capabilities over an extended area where a customer could be present and verbally making an order.

One or more graphical displays 140, which may be a television screen or other visual display capable of conveying light, images, and/or video, can be used to collect and/or convey information pertaining to the business' ordering options. It is contemplated that a display can be utilized to advertise and/or upsell a product or service based on various operational characteristics collected by the cameras 134/136, microphones 138, or one or more other sensors 142.

The ordering device 130, in some embodiments, employs multiple other sensors 142, such as detectors of environmental conditions, acoustic detectors, or proximity detectors. The use of sue sensors 142 can provide data that can be used independently or collectively by a local controller 144. For instance, the local device controller 144 can input data from one or more sensors 142 to alter and optimize the operating conditions of a camera, microphone, or display 140. In another non-limiting example, the data collected from a sensor 142 can be employed to verify or redundantly detect aspects of a customer, such as type of vehicle driven, ethnicity, gender, and customer state of origin.

While the local controller 144 can direct operation of the various hardware and/or software aspects contained within the device housing 132, which may involve the collection of a customer's verbal, gestural, or online order, the controller 144 may be supplemented by a downstream ordering module 146 that comprises circuitry capable of intelligently discerning the data collected from the various hardware aspects of the housing 132 and generating an order that can be fulfilled by the business. That is, the local controller 144 can collect data and optimize operation of various hardware components, but cannot interpret the collected data into an order to be fulfilled. Meanwhile, the collected customer data is processed by the ordering module 146 into an order that is fed to the order interface 112 and/or to a human employee 110 to be executed and completed.

In some embodiments, the controller 144 can alter the physical location of one or more cameras, microphones, and sensors within the device housing 132 to optimize ordering conditions and parameters. For instance, microphones and associated speakers conducting noise cancellation can be physically relocated to various supplemental positions within the housing 132 to optimize the cancellation of noise. Similarly, a camera can be physically moved to more accurately detect customer and/or vehicle characteristics. The ability to physically move cameras, microphones, speakers, and sensors between a default position and one or more supplemental locations within the housing 132 can provide robust options for the controller 144 to detect a customer, identify various customer characteristics, efficiently take an order, and convey the order for fulfillment.

By employing the local controller 144 to optimize hardware operation and the ordering module 146 to interpret collected data and directing orders to a suitable destination, the accuracy and efficiency of taking and fulfilling a customer's order can be increased. Although not limiting, the ordering module 146 may decide where to send an order based on one or more collected data from the ordering device 130, such as sending an order to a human 110 for upselling, heightened hospitality, or troubleshooting while other orders go straight to the order interface 112 without engaging the human employee 110.

FIG. 4 depicts a block representation of an example ordering module 160 that can be utilized in an ordering system in accordance with assorted embodiments. The ordering module 160 may be physically positioned anywhere on a business' site, such as within an ordering device housing 132, in a computing device within a building, or in a mobile computing device worn or carried by a human employee 110.

Regardless of where the ordering module 160 is located, a local controller 162, such as a microprocessor or other programmable circuitry, can direct order taking operations. It is noted that the module controller 162 may be employed alone or in combination with a device controller 144 to optimize order taking, processing, and fulfillment. The local module controller 162 can employ one or more memories 164 for temporary and/or permanent storage of collected data and executed software. A memory 164 may be a cache, buffer, or table that is a volatile or non-volatile type of data storage.

In some embodiments, the memory 164 stores a log 166 of experienced activity, which may include customer data collected by an ordering device 130, order information, and information pertaining to fulfillment of the order. The maintenance of the log 166 according to customer allows for efficient recall of a customer's profile, ordering optimizations, preferences, and potential upsell items. Logged information may further be utilized by the local module controller 162 to alter and optimize the collection, processing, and fulfillment of a customer's order as part of an optimization strategy. For instance, information of the log 166 can be used to alter the criteria in which orders are sent to a human employee versus directly to the ordering interface.

Information that is collected, regardless whether the information is stored in memory 164 or logged 166, can be interpreted by prediction circuitry 168 to generate one or more prospective customer actions. That is, the prediction circuitry 168 can interpret input information from a customer to predict activity of one or more customers. As a non-limiting example, the prediction circuitry 168 can interpret the collected information about a customer's car, ethnicity, accent, or past logged ordering history into future orders, successful upsell items, and hardware optimizations to make order collection more efficient.

One such hardware optimization can be active noise cancellation (ANC) during order taking that is carried out by an ANC circuitry 170. It is noted that the ANC circuitry 170 may operate independent of predicted customer activity or previously collected customer information. As such, the ANC circuitry 170 can operate upon every customer order, or selected customers, based on current, previous, or predicted customer actions, behavior, and information. The ANC circuitry 170 can direct operation of one or more microphones and speakers to actively cancel selected noise frequencies by emitting the inverse of those noise frequencies. It is contemplated that the ANC circuitry 170 is optimized by the local module controller 162 for different noise frequencies based on at least the current sensed weather conditions, pitch and volume of customer's speech, and distance from the ordering device.

The ordering module 160 may further employ an identification circuitry 172 that interprets collected customer information into a known customer database. For instance, the identification circuitry 172 can collect information about a customer's car, such as make, model, and license plate number, a customer's face, such as optical facial recognition, and a customer's voice, via speech recognition, to correlate a known customer profile that provides historical and predicted hardware, ordering, and fulfillment optimizations. In the event no known profile is present, the ordering module 160 may create one or revert to an existing profile deemed close based on collected customer information.

With the ANC 170 and identification 172 circuitries respectively receiving customer orders in an optimized fashion, an automation circuitry 174 can optimize the fulfillment of the customer's order. The automation circuitry 174 may bypass, or concurrently operate with, the order interface 112 and human employee 110 to conduct one or more actions that prepare and/or fulfill a placed order. It is contemplated that the automation circuitry 174 can operate in conjunction with the prediction circuitry 168 to conduct order fulfillment actions based on a predicted customer order and without an actual customer order. As an example, the automation circuitry 174 may prompt an employee to conduct an action, such as start cooking food, prepare a tool, or move supplies, based on actual or predicted customer orders. The automation circuitry 174 may, alternatively, activate an automated process, such as heating an oven, thawing food, or generating a food item, without involvement of an employee.

At any time, the ordering module 160 can assess the environment in which orders are taken and/or fulfilled with an environmental circuitry 176. Such circuitry 176 can activate more or more sensors, cameras, microphones, and other detectors to determine one or more environmental conditions, such as, but not limited to, temperature, humidity, wind speed, wind direction, oven temperature, oil temperature, food temperature, power consumption, customer wait time, order fulfillment time, and employee movement patterns. The ability to assess the environment in which orders are taken and subsequently fulfilled allows the ordering module 160 to alter operating conditions of ordering hardware, such as speaker volume, number of microphones activated, and display brightness, as well as ordering fulfillment, such as employee position, food supplies, and cooking equipment condition.

The assorted capabilities of the ordering module 160 may be concurrently, or independently, operating. Through the collection of customer and environmental input information, the various hardware and software aspects of the module 160 can create an optimization strategy that can consist of one or more reactive and/or proactive actions to be taken immediately or in response to a predetermined trigger, such as number of food items ordered. The optimization strategy can, in some embodiments, be a derivation of a known customer profile and current detected conditions so that ordering and order fulfillment is as efficient and accurate as possible. Thus, the ordering module 160 can provide optimal customer service based on the optimization strategy developed and carried out with the diverse variety of hardware and software capabilities directed by the local module controller 162.

Figure 5:
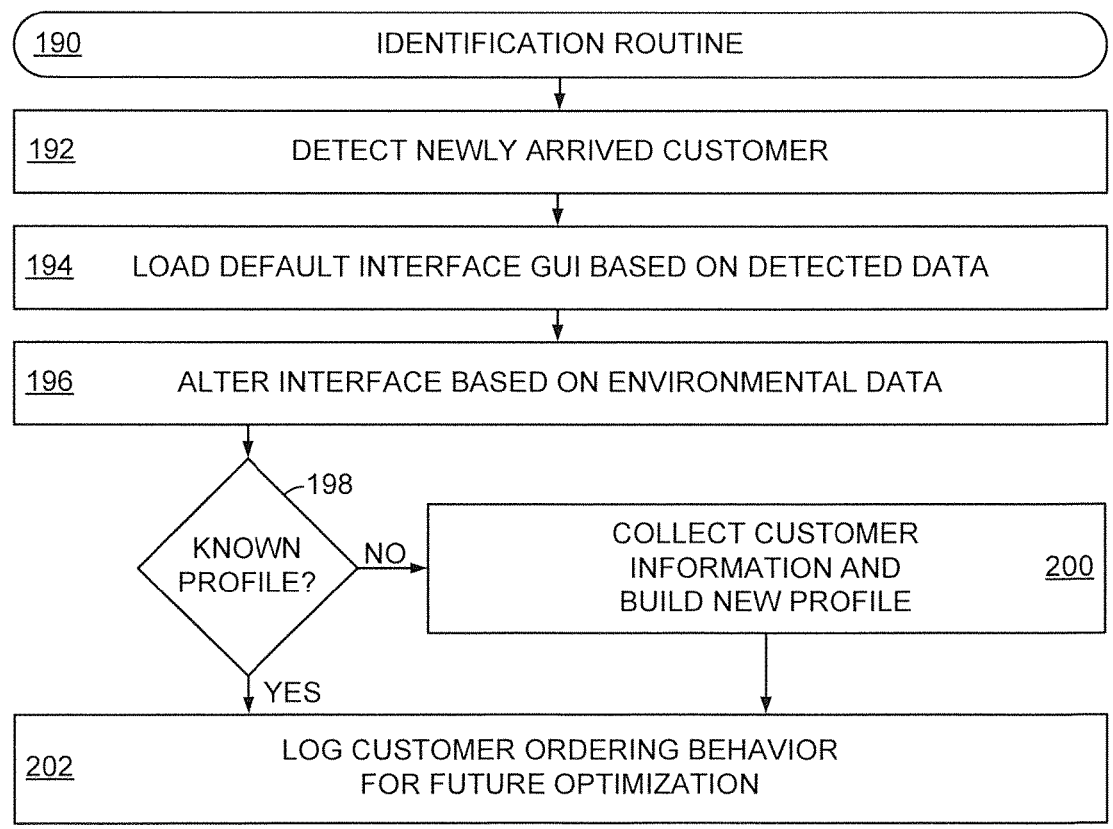
FIG. 5 depicts an example environment routine that can be carried out by an outside ordering system.

FIG. 5 depicts an example identification routine 190 that can be carried out by the ordering module 160 of FIG. 4 as part of an outside ordering system in accordance with various embodiments. It is noted that the routine 190 can be executed by the local module controller 162 with, or without, an ordering device controller 144 to carry out an optimization strategy generated in response to a newly arrived customer detected in step 192. Such detection may occur at any time and with any number, and type, of sensors. For example, one or more optical, acoustic, and mechanical sensors can detect the presence of a customer at any position relative to an outside ordering device.

Once a customer is initially detected, a default ordering interface graphical user interface (GUI) is loaded into the outside ordering device in step 194. It is contemplated that step 194 loads a GUI based on the type of car, state of car registration, or ethnicity of customer. Such a focused GUI can increase the efficiency and comfort of initial interaction between the business and the customer. The focused GUI, in some embodiments, can involve alterations to ordering hardware, such as camera, microphone, or other sensor settings. For instance, a microphone array can be activated, adjusted for volume, adjusted for direction, and redundantly checked with a supplemental, different sensor in response to initial detection of the presence of a customer.

With the presence of a customer, step 196 alters at least one ordering interface based on detected environmental data. As a non-limiting example, detection of wind, temperature, or humidity can prompt step 196 to alter microphone, camera, ANC, or other ordering interface settings to correct, or eliminate, the effects of the detected environmental data. It is contemplated that steps 194 and 196 can be inverted with portions of the ordering interface being optimized for detected, current weather and other environmental conditions with, or without, the presence of a customer.

At any time after a customer is detected in step 192, an ordering module can poll collected customer information against a stored database in decision 198 to identify if the customer is known and has an existing profile. If not, step 200 proceeds to build a new customer profile, which may involve adding, changing, or removing portions of a default interface. A known profile is not limited to a particular set of criteria, but can consist of various historical and current data, such as past orders, order times, money spent, vehicles driven, facial features, speech characteristics, allergies, successful predicted customer actions, and successful upsell deviations from placed orders.

By loading a known profile, various aspects of the ordering device can automatically alter, in some embodiments, hardware, such as camera, microphone, or other sensor of the ordering device, or software, such as display font, background color, greeting, facial recognition criteria, speech recognition criteria, or destination for a placed order between the order interface or a human employee. A loaded profile can be continually optimized in step 202 by logging various customer ordering behavior, such as speech inflection, tone, and facial expressions. The logging of customer behavior may be interpreted by the ordering module for future optimization, such as future upsell potential, automation of customer orders, and other efficiency heightening alterations to hardware, software, and order fulfillment.

Figure 6:
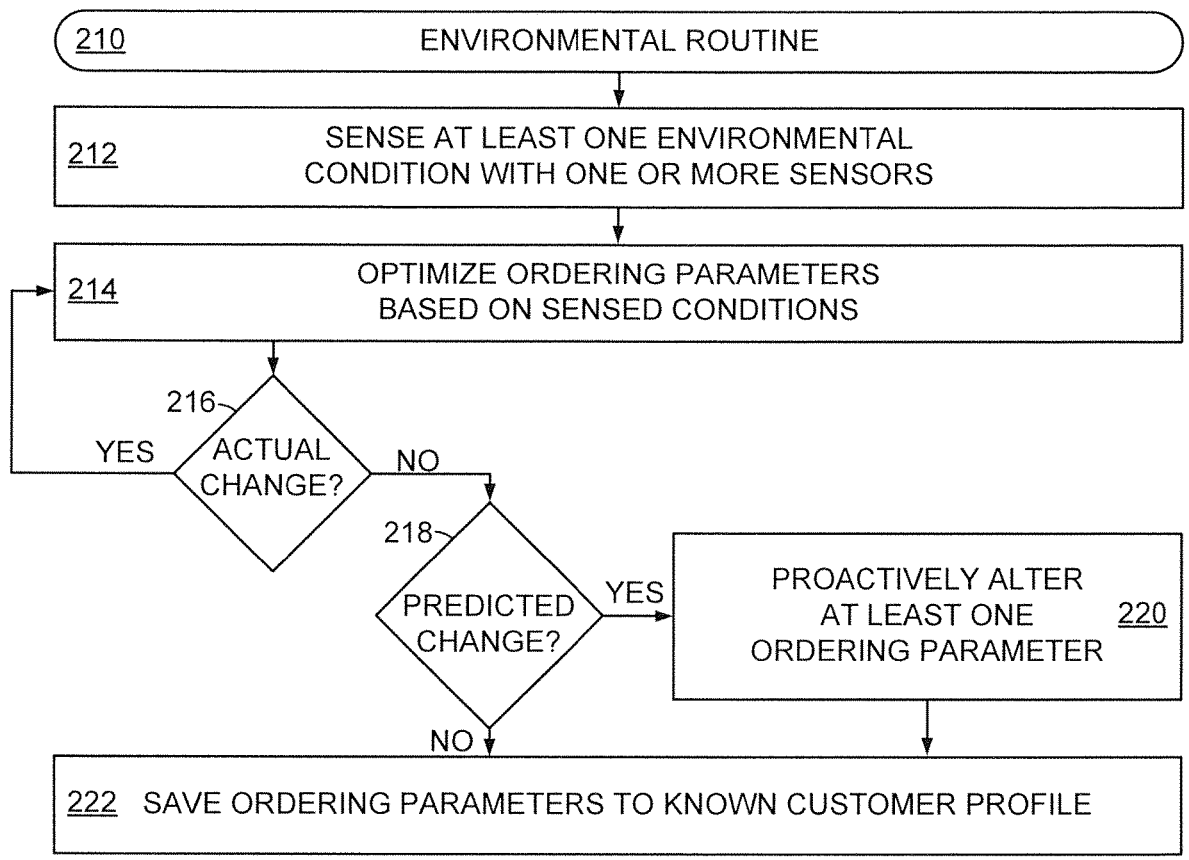
FIG. 6 conveys an example identification routine executed by an outside ordering system in accordance with some embodiments.

It is noted that the various steps and decisions of the identification routine 190 can be carried out by the identification circuitry of the ordering module in combination with a module controller and, perhaps, an outside ordering device controller. Assorted environmental steps and decisions may concurrently, or sequentially, be carried out by the environmental circuitry of an ordering module in combination with one or more controllers. FIG. 6 depicts an example environmental routine 210 that may be performed independently or concurrently with routine 190. The routine 210 begins by activating one or more environmental sensors in step 212 to sense at least one environmental condition, such as wind, light, moisture, noise, and temperature.

The sensed environmental condition(s) are then utilized in step 214 to optimize one or more ordering parameters. For instance, step 214 can involve adjusting display brightness for light, tuning ANC for wind and/or background noise, tuning speakers and/or microphones for humidity, and adjusting volume and/or gain for temperature so that ordering is efficient and accurate for both the customer and the employees fulfilling the order. The operation of step 214 can be further modified, in some embodiments, to accommodate a known customer profile that has one or more customizations, such as speaker volume and microphone gain.

Any time after an initial optimization of ordering parameters for sensed environmental conditions decision 214 can evaluate if an actual change in conditions has occurred and jeopardizes the accuracy or efficiency of ordering. If so, step 214 is revisited and ordering parameters are again optimized for the current environmental conditions. If no actual change is present, decision 218 evaluates if an environmental change is predicted from the prediction circuitry of the ordering module. Such a prediction can involve the currently sensed environmental conditions as well as one or more logged, or modeled, environmental condition previously experienced or mathematically computed.

A predicted environmental change prompts step 220 to proactively alter at least one ordering parameter to mitigate, or completely avoid, the predicted environmental condition from degrading ordering accuracy or efficiency. The proactive action of step 220 may involve any hardware and/or software alteration. For instance, the outside ordering device may activate different cameras, microphones, or speakers, may physically move a microphone or speaker to an alternative location within the device housing, may alter the ANC frequencies being cancelled, or may send an order to a human instead of automating the ordering process via the order interface.

Although environmental conditions can change or be different during different customer visits, the various ordering parameters can be saved to a known customer profile in step 222 and can be used as a baseline that may make future environmental condition ordering optimizations faster and more accurate. As such, the environmental optimizations can undergo machine learning over time via the ordering module to continually increase the effectiveness of environmental ordering adaptations.

Figure 7:
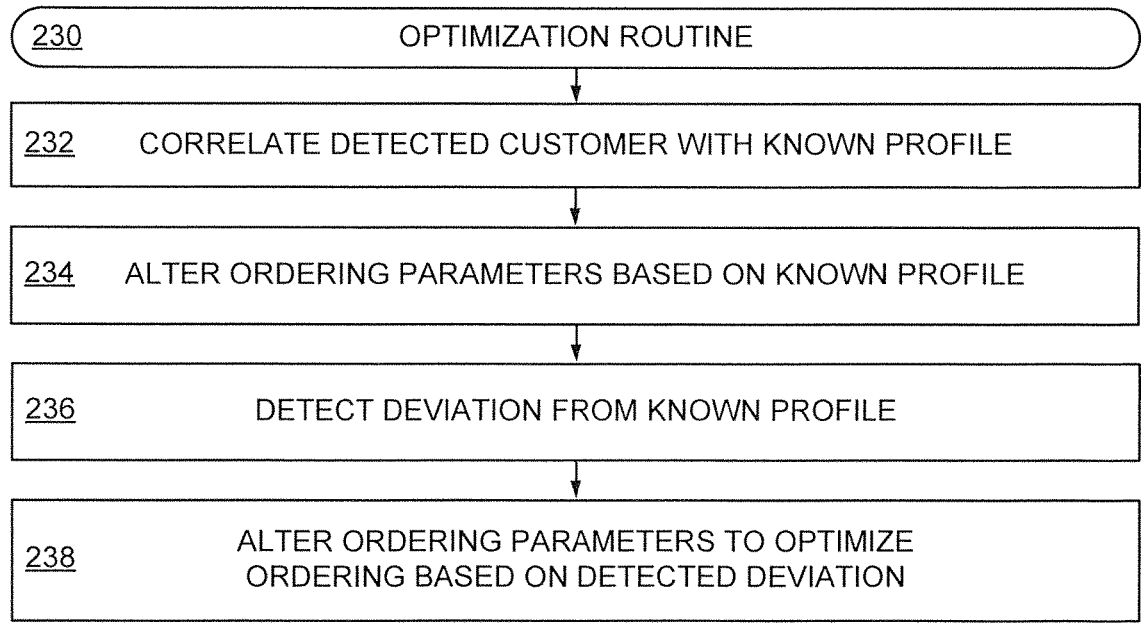
FIG. 7 provides a flowchart of an example ordering optimization routine carried out in accordance with assorted embodiments.

Through the utilization of the prediction, identification, and environmental circuitries of the ordering module, the speed, accuracy, customer satisfaction, and upsell potential of outside customer order taking and fulfillment can be increased. FIG. 7 depicts an example optimization routine 230 that can be conducted by the various embodiments of an ordering module in an outside customer ordering environment. Ordering optimization initially correlates a detected customer with a known profile, as generally described in the identification routine 190. In the event no known profile exists, an ordering profile may utilize a default profile, build a new profile, and/or guess at an approximate profile based on one or more detected customer characteristics, such as vehicle type, state of vehicle registration, cleanliness of the vehicle, customer ethnicity, customer gender, number of people in the vehicle, and time of day.

Regardless of the profile loaded by an ordering module, step 234 proceeds to alter one or more ordering parameters in accordance with the known profile. The customization of an operating parameter may, or may not, be apparent to the customer and can result in the customer hearing or seeing ordering details better, understanding more of the available goods, purchasing upon suggestion, and having a high level of satisfaction during and after the ordering process.

While the loading of a known profile can help ensure satisfaction of the customer in many situations, a known profile can be improved over time via artificial intelligence and/or machine learning of a customer's behavior. That is, a known customer profile allows customer activity to be tracked and learned over time to allow quick and accurate predictions of customer behaviors, preferences, and successful upsell opportunities. For instance, an ordering module can cyclically predict customer behavior from previously logged activity, such as order volume for a time of day, and then analyze whether the prediction was correct.

As a result, the ordering module can intelligently learn the preferences of a customer without the customer actually filling out, selecting, or otherwise completing a survey of preferences, which allows the outside ordering system utilized in routine 230 to be more of a concierge that learns based on normal customer behavior instead of invasive questions and/or surveys that tend to annoy the customer and not convey an accurate profile of preferences over time.

Hence, step 236 detects one or more deviations from a known profile for a customer and engages in at least one reactive action in step 238 that alters at least one ordering parameter to provide short-term optimization of ordering conditions. It is contemplated that step 238 may conduct proactive alteration of one or more ordering parameters, as directed by the artificial intelligence and/or machine learning of the ordering module, to find a long-term solution that corresponds with a set of ordering parameters at least for the hardware and software aspects of the outside ordering device.

The assorted embodiments of the present disclosure provide optimized outside ordering for a customer and for the business fulfilling the order. The ability to alter operating parameters associated with outside ordering device hardware and software allows orders to be efficiently and accurately placed. By utilizing intelligence, an ordering module can provide efficient order fulfillment by automating the ordering process or injecting a human employee when necessary. The development of a known customer profile by an ordering module further optimizes the ordering process, increases customer satisfaction, and heightens profitability via upselling of goods not directly ordered by the customer.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. A system comprising a controller, a first camera array, a second camera array, a microphone array, and a speaker positioned within a device housing located outside of a building, the controller connected to an ordering module disposed between the device housing and an order interface, the camera array positioned to identify a vehicle in which a customer resides and at least one facial gesture of the customer, the order module comprising a prediction circuit to predict an action of the customer in response to the at least one facial gesture of the customer.

2. The system of claim 1, wherein a display is positioned within the device housing and connected to the controller.

3. The system of claim 1, wherein the at least one sensor is positioned within the device housing and connected to the controller.

4. The system of claim 1, wherein the microphone array and speaker are connected to a noise cancellation circuit.

5. The system of claim 1, wherein the microphone array is positioned to detect speech of the customer.

6. The system of claim 1, wherein the first camera array comprises multiple separate optical detectors.

7. The system of claim 1, wherein the microphone array comprises multiple separate acoustic detectors.

8. The system of claim 1, wherein the camera array is positioned to read a license plate of the vehicle.

9. The system of claim 1, wherein the first camera array is physically moved by the controller in response to an environmental condition predicted by the prediction circuit.

10. The system of claim 1, wherein an environmental circuitry of the ordering module proactively alters an order parameter in response to an environmental condition predicted by the prediction circuit.

11. The system of claim 1, wherein the prediction circuit is configured to start fulfilling an order predicted by the prediction circuit based on the at least one facial gesture of the customer prior to the customer place placing any real order.

12. The system of claim 1, wherein the ordering module comprises an active noise cancellation circuit configured to cancel noise at a selected frequency based on a pitch and a volume of the customer detected by the microphone array.

13. The system of claim 1, wherein the ordering module comprises an identification circuit configured to correlate the at least one facial gesture with a customer profile stored in the ordering module.

14. An apparatus comprising:
 a device housing positioned outside of a building;
 a controller positioned within the device housing;
 a camera array positioned within the device housing and connected to the controller, the camera array positioned to identify a vehicle in which a customer resides and at least one facial gesture of the customer, at least one camera array physically moved by the controller in response to a degraded ordering condition detected by the controller;
 an ordering module connected to the controller and positioned external to the device housing; and
 an order interface connected to the ordering module.

15. The apparatus of claim 14, wherein the ordering module comprises an automation circuit configured to bypass a human employee to enter a customer order into the order interface.

16. The apparatus of claim 14, wherein the ordering module comprises an environmental circuit configured to detect a weather condition with at least one sensor positioned in the device housing.

17. The apparatus of claim 14, wherein the camera array, a microphone, and a sensor are each connected to the ordering module and provide detected data about the customer.

18. The apparatus of claim 14, wherein the order interface is positioned in a kitchen of the building.

19. The apparatus of claim 14, wherein the ordering module is connected to a mobile computing device carried by a human employee.

* * * * *